United States Patent
Fresko et al.

(10) Patent No.: US 6,836,782 B1
(45) Date of Patent: Dec. 28, 2004

(54) METHOD AND APPARATUS FOR IMPLEMENTING MODULAR GARBAGE COLLECTORS

(75) Inventors: Nedim Fresko, San Francisco, CA (US); Dean R. E. Long, Boulder Creek, CA (US); Christopher J. Plummer, San Martin, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 669 days.

(21) Appl. No.: 09/836,927

(22) Filed: Apr. 17, 2001

Related U.S. Application Data

(60) Provisional application No. 60/210,924, filed on Jun. 12, 2000.

(51) Int. Cl.$^7$ .............................................. G06F 17/30
(52) U.S. Cl. ........................... 707/206; 707/103; 707/1; 718/104
(58) Field of Search ................................. 718/100, 101, 718/102, 103, 104; 707/1; 713/16; 719/310, 317, 318, 320, 326

(56) References Cited

U.S. PATENT DOCUMENTS

| | | | | |
|---|---|---|---|---|
| 5,561,785 A | * | 10/1996 | Blandy et al. | 711/170 |
| 5,692,193 A | * | 11/1997 | Jagannathan et al. | 718/106 |
| 5,845,298 A | * | 12/1998 | O'Connor et al. | 707/206 |
| 6,065,020 A | * | 5/2000 | Dussud | 707/206 |
| 6,081,665 A | * | 6/2000 | Nilsen et al. | 717/116 |
| 6,098,889 A | * | 8/2000 | Ogawa et al. | 235/492 |
| 6,671,707 B1 | * | 12/2003 | Hudson et al. | 707/206 |

FOREIGN PATENT DOCUMENTS

| | | |
|---|---|---|
| EP | 0959409 | 11/1999 |
| EP | 0994416 | 4/2000 |
| WO | WO 0033192 | 6/2000 |

OTHER PUBLICATIONS

International Search Report in corresponding PCT application PCT/US 01/18465.

* cited by examiner

*Primary Examiner*—Majid Banankhah
(74) *Attorney, Agent, or Firm*—Beyer Weaver & Thomas, LLP

(57) ABSTRACT

Methods and apparatus for efficiently enabling garbage collectors to be swapped into and out of virtual machine environments are disclosed. According to one aspect of the present invention, an interface for reclaiming memory in a multi-threaded virtual machine environment that has a virtual machine includes a first module that is associated with the virtual machine and a second module that is separate from the first module but interfaces with the first module. The first module includes a first routine for initiating a garbage collection process within the virtual machine environment, a second routine for scanning roots associated with the virtual machine environment, and a third routine for following roots through objects associated with the virtual machine environment. The second module includes a fourth routine for initializing a heap in the virtual machine environment, a fifth routine for allocating an object in the virtual machine environment, and a sixth routine for performing the garbage collection process. In one embodiment, the second module also includes a seventh routine for implementing read and write barriers for the garbage collection process.

13 Claims, 6 Drawing Sheets

METHOD AND APPARATUS FOR IMPLEMENTING MODULAR GARBAGE COLLECTORS

CROSS REFERENCE TO RELATED APPLICATION

This application takes priority under U.S.C. 19(e) of United States Provisional application No. 60/210,924 filed Jun. 12, 2000 entitled, "METHOD AND APPARATUS FOR IMPLEMENTING MODULAR GARBAGE COLLECTORS" by Fresko et. al. which is incorporated by reference in its entirety.

BACKGROUND OF THE INVENTION

1. Field of Invention

The present invention relates generally to the performance of garbage collection in object-based systems. More particularly, the present invention relates to enabling different garbage collectors to be implemented for use with a virtual machine substantially altering the virtual machine to support each garbage collector.

2. Description of the Related Art

Within an object-based environment, threads are often used to satisfy requests for services. A thread may be thought of as a "sketch pad" of storage resources, and is essentially a single sequential flow of control within a computer program. In general, a thread, or a "thread of control," is a sequence of central processing unit (CPU) instructions or programming language statements that may be independently executed. Each thread in a multi-threaded environment has its own execution stack on which method activations reside. As will be appreciated by those skilled in the art, when a method is activated with respect to a thread, an activation is "pushed" on the execution stack of the thread. When the method returns, or is deactivated, the activation is "popped" from the execution stack. Since an activation of one method may activate another method, an execution stack operates in a first-in-last-out manner.

While maintaining multiple threads, a computing system may need to perform global operations which require synchronization, or control of all threads or a set of threads at a given time. One example of such a global operation is garbage collection. As will be appreciated by those skilled in the art, garbage collection is a method which allows memory storage associated with objects which are no longer alive to be automatically reclaimed.

Garbage collection generally occurs in two phases. A first phase typically involves identifying objects which are no longer needed or no longer in use, while a second phase renders the storage associated with the unneeded objects available for reallocation. An object in a program is needed, or alive, at a given time if a program may access the object in the future. When an object is such that it will not be accessed in the future the object is considered to be unneeded or dead. Garbage collection algorithms, or "garbage collectors," typically consider an object to be dead substantially only when a program has abandoned all pointers to the object, making future access to the object impossible.

Within systems which use garbage collectors, e.g., within systems which include virtual machines, when it is desired for a garbage collector to be modified or replaced with another garbage collector, the virtual machine itself must also be modified to support the modified or replacement garbage collector. At times, it may be desirable to replace an existing garbage collector in a system with a different garbage collector to improve the efficiency of garbage collection and, hence, the performance of the system. Typically, the process of altering or changing a garbage collector is time-consuming as it often requires substantial modifications be made to the virtual machine to accommodate the altered or new garbage collector.

Therefore, what is desired is a relatively inexpensive method and apparatus for enabling a garbage collector associated with a virtual machine to either be modified or changed. Specifically, what is needed is a method and an apparatus for enabling garbage collectors to be efficiently swapped into and swapped out of virtual machine systems.

SUMMARY OF THE INVENTION

The present invention relates to methods and apparatus for enabling modular garbage collectors to be swapped into and swapped out of virtual machines without requiring that the virtual machines be altered. According to one aspect of the present invention, an interface for reclaiming memory in a multi-threaded virtual machine environment that has a virtual machine includes a first module that is associated with the virtual machine and a second module that is separate from the first module but interfaces with the first module. The first module includes a first routine for initiating a garbage collection process within the virtual machine environment, a second routine for scanning roots associated with the virtual machine environment, and a third routine for following roots through objects associated with the virtual machine environment. The second module includes a fourth routine for initializing a heap in the virtual machine environment, a fifth routine for allocating an object in the virtual machine environment, and a sixth routine for performing the garbage collection process. In one embodiment, the second module also includes a seventh routine for implementing read and write barriers for the garbage collection process.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

In the following description, numerous specific details are set forth in order to provide a thorough understanding of the present invention. It will be apparent, however, to one skilled in the art that the present invention may be practiced without some or all of these specific details. In other instances, well known structures or operations have not been described in detail in order to not unnecessarily obscure the invention.

A garbage collection framework which enables different garbage collectors to be developed and readily "plugged into" the framework without requiring changes to be made to a virtual machine increases the flexibility of systems which use the garbage collectors. For example, an improved garbage collector may be readily implemented in an existing system to increase the efficiency with which the system operates, thereby increasing overall system performance.

In one embodiment, a virtual machine environment maintains a memory system substantially separately from a virtual machine, and separates common garbage collection routines, e.g., scanning routines, from algorithm-specific routines. To enable garbage collectors to be plugged into a virtual machine environment without affecting a virtual machine, algorithm-specific garbage collection routines may be maintained separately from common or shared garbage collection routines.

Figure 1A:
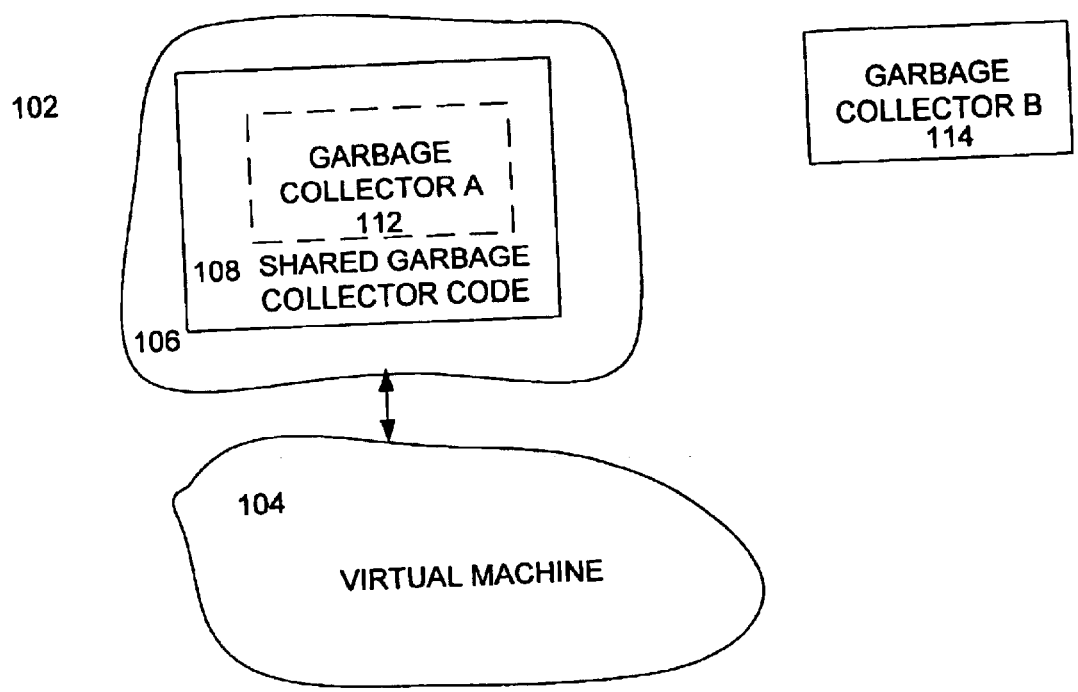
FIGS. 1A and 1B are a diagrammatic representation of an environment which supports pluggable garbage collectors in accordance with an embodiment of the present invention.

FIG. 1A is a diagrammatic representation of an environment which enables garbage collectors to be swapped in and swapped out without requiring that a virtual machine be altered in accordance with an embodiment of the present invention. An environment 102, e.g., a virtual machine environment, includes a virtual machine 104 and a memory system 106 that is substantially separated from virtual machine 104. One example of a virtual machine will be described below with reference to FIG. 6. Allowing memory system 106 to be substantially separated from virtual machine 104 facilitates the ability to use different garbage collectors interchangeably with respect to environment 102.

Figure 1B:
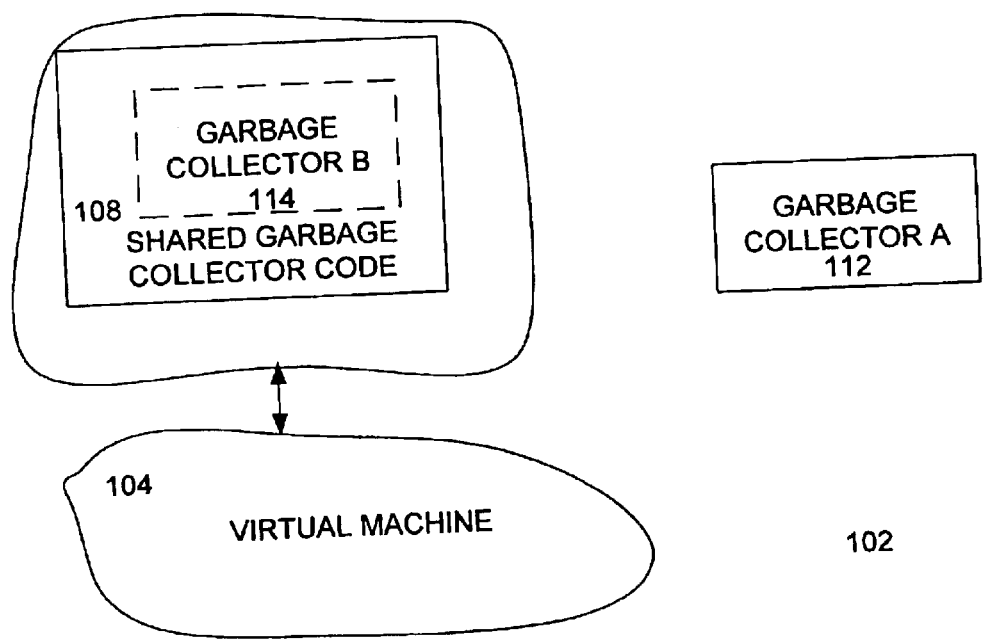

Memory system 106 includes shared garbage collector code 108 which enables substantially any specific garbage collector, as for example garbage collector 112, to be implemented with respect to memory system 106. The use of shared garbage collector code 108 enables specific garbage collectors, such as specific garbage collectors 112 and 114, to be used substantially interchangeably with respect to virtual machine 104 without requiring modifications to be made to virtual machine 104. As shown in FIG. 1B, specific garbage collector 114 may be used to perform garbage collection on memory system 106 in lieu of specific garbage collector 112.

In order for garbage collectors 112 and 114 to be substantially pluggable, garbage collectors 112 and 114 are written to interface with shared garbage collector code 108. Hence, as long as garbage collectors 112 and 114 are consistent with shared garbage collector code 108, garbage collectors 112 and 114 may be implemented without modifying virtual machine 104.

In addition to shared garbage collector code 108, code associated with memory system 106, i.e., memory system code, which may be used by a virtual machine generally includes code that initializes heaps and allocates object. Shared garbage collector code 108 which is intended to be used by substantially any suitable garbage collection implementation may include, but is not limited to, code which stops thread execution at garbage collection safe points, code that identifies and scans exact roots, code that finds and scans references in objects or arrays, and code that handles special objects and cases. The special objects and cases may include weak references, finalization, string interning, and class uploading.

Although the virtual machine environment in which modular or pluggable garbage collectors are used may be widely varied, in the described embodiment, the virtual machine environment is a Java™ virtual machine environment, developed by Sun Microsystems, Inc. of Palo Alto, Calif. In a Java™ environment, shared garbage collection interfaces or routines which a modular or pluggable garbage collection implementation, e.g., a developer-written implementation, uses may include, but are not limited to, a "CVMgcStopTheWorldAndGC( )" routine which effectively initiates a garbage collection, a "CVMgcScanRoots( )" routine which scans for exact garbage collection roots, a "CVMobjectWalkRefs(obj, callback)" routine which walks through objects, and "CVMgcScanSpecial( )" and "CVMgcProcessSpecialWithLivenessInfo( )" routines which are arranged to handle special objects. If a garbage collection implementation utilizes such routines, then the garbage collection implementation, e.g., a specific garbage collector, may be efficiently plugged into a virtual machine environment.

A specific garbage collection implementation that is pluggable will generally include algorithm-specific garbage collection code. Each garbage collection implementation may have its own type of heap layout, its own heap initialization process, and its own heap teardown process. Algorithm-specific code may also have specific object allocation processes, specific object reclamation algorithms, and specific read and write barriers. By way of example, the read and write barriers associated with generational garbage collectors may be specified in algorithm-specific code, and are substantially unaffected by the associated virtual machine environment. In one embodiment, if no implementation of read and write barriers are provided by algorithm-specific code, the barriers are considered to be empty.

In general, in order for algorithm-specific garbage collection code to be recognized by shared garbage collection code once the algorithm-specific garbage collection code is interfaced with the shared garbage collection code, routines associated with the algorithm-specific code have names which are specified by the share garbage collection code. Within a Java™ environment, for example, an algorithm-specific heap initialization routine may be expected to be implemented as a "CVMgccimpInitHeap( )" process. In other words, the shared garbage collection code may be arranged to make a call to a "CVMgccimpInitHeap( )" method in order to initialize a heap. Similarly, an algorithm-specific object allocation routine may be expected to be implemented as a "CVMgcimp1AllocObject(size)" method, and an algorithm-specific garbage collection performed once threads are stopped may be expected to be implemented as a "CVMcimp1GC( )" method. In addition, an algorithm-specific read barrier may be expected to be implemented as either a "CVMgcimp1ReadBarrierRef( )" method or a "CVMgcimp1ReadBarrier<T>" method, while an algorithm-specific write barrier may be expected to be implemented as either a "CVMgcimpWriteBarrierRef( )" method or a "CVMgcimp1WriteBarrier<T>" method.

Figure 2:
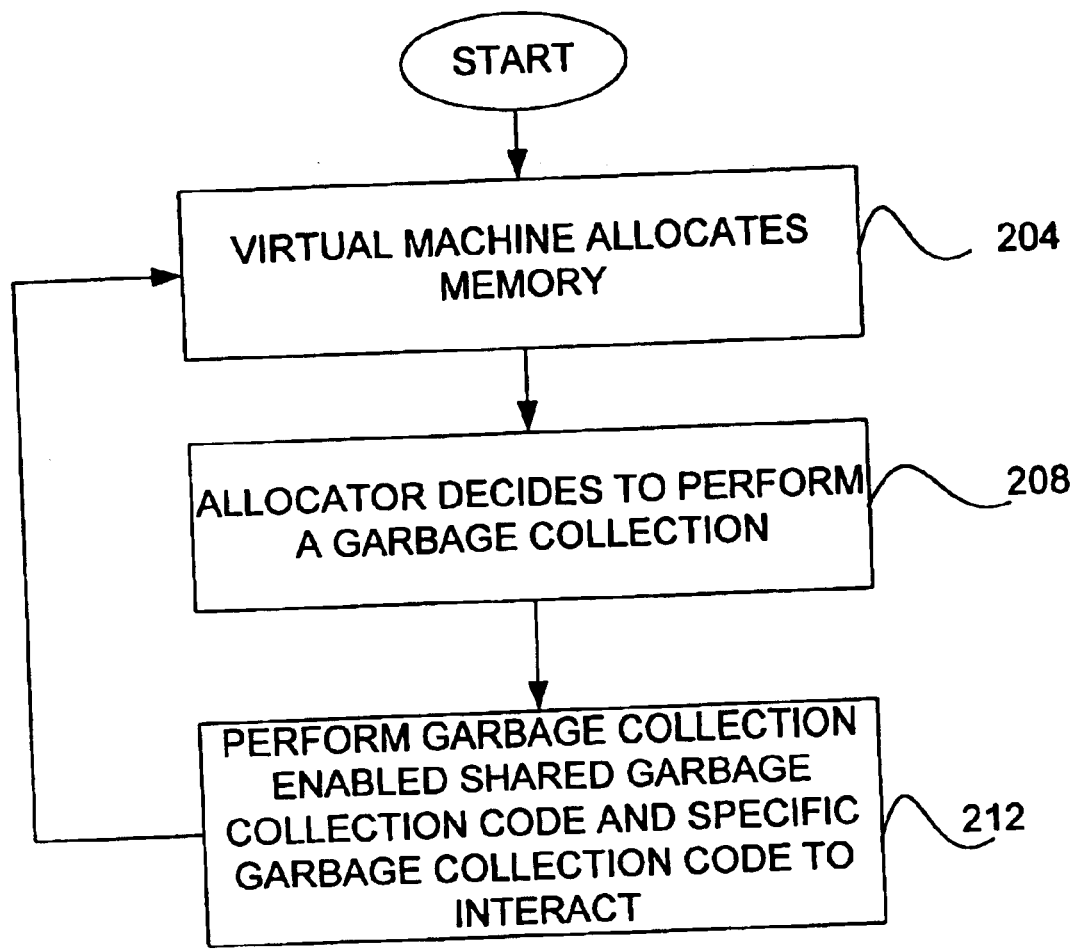
FIG. 2 is a process flow diagram that illustrates the steps associated with the overall operation of a virtual machine in accordance with an embodiment of the present invention.

FIG. 2 is a process flow diagram which illustrates the steps associated with the overall operation of a virtual machine in accordance with an embodiment of the present invention. A virtual machine allocates memory in step 204. In general, a virtual machine may allocate memory to objects as needed using a memory allocator. When there is insufficient memory to allocate objects, then the memory allocator typically decides to perform a garbage collection in order to reclaim memory space in step 208. Reclaiming memory space using a garbage collection, as will be appreciated by those skilled in the art, typically involves reclaiming memory space allocated to objects which may no longer be accessed. As will be appreciated by those skilled in the art, when a memory allocator decides to perform a garbage collection, a safe-point typically must be reached within the overall environment before a global operation, such as a garbage collection, which requires synchronization is performed.

In step 212, a garbage collection is performed. In the described embodiment, performing a garbage collection includes allowing shared garbage collection code, e.g., code that is shared by different garbage collectors, to interact with specific garbage collection code, e.g., garbage collection code associated with a specific garbage collector. One method of performing garbage collection will be described below with respect to FIG. 3. After the garbage collection is performed, then process flow returns to step 204 in which the virtual machine is allowed to continue to allocate memory.

Figure 3:
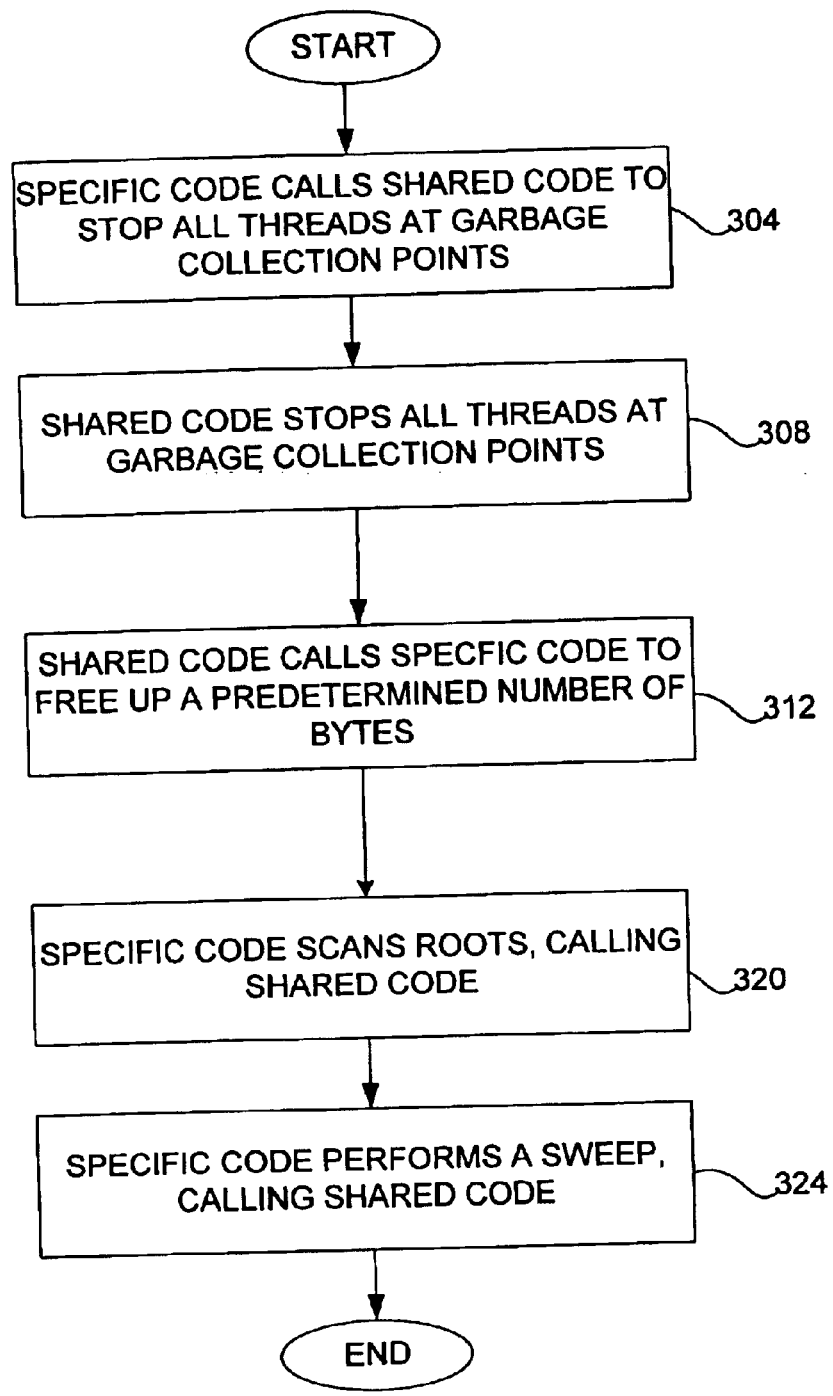
FIG. 3 is a process flow diagram that illustrates the steps associated with performing a garbage collection, e.g., step 212 of FIG. 2, in accordance with an embodiment of the present invention.

Referring next to FIG. 3, one method of performing garbage collection using a pluggable or modular garbage collector which includes shared code, e.g., code associated with a virtual machine, and code that is specific to the garbage collector will be described in accordance with an embodiment of the present invention. That is, step 212 of FIG. 2 will be described. A garbage collection begins at step 304 in which garbage collector specific code calls shared code to stop all threads at garbage collection points for the threads, e.g., at thread-specific safe-points.

All threads are stopped at the appropriate garbage collection points by the shared code in step 308. At garbage collection points, each thread of a system polls for garbage collection using, for example, method call points and backward branches in the shared code. In one embodiment, a thread at a garbage collection point may save its garbage collector scannable state and suspend itself.

After all threads are stopped, then the shared code calls the specific code in step 312 to free up a predetermined number of bytes. In step 320, the specific code scans roots by calling methods included in the shared code. The roots may be scanned in order to process special roots by walking through the memory on which garbage collection is being performed. Once the roots are scanned, the specific code performs a sweep through the memory by calling shared code in step 324. The sweep enables the predetermined number of bytes to be freed, and the garbage collection is competed.

The garbage collector used to perform the garbage collection described in FIG. 3 is a mark and sweep garbage collector, as will be appreciated by those skilled in the art. In general, the pluggable garbage collector of the present invention may be substantially any suitable garbage collector, and is not limited to being a mark and sweep garbage collector.

Figure 4:
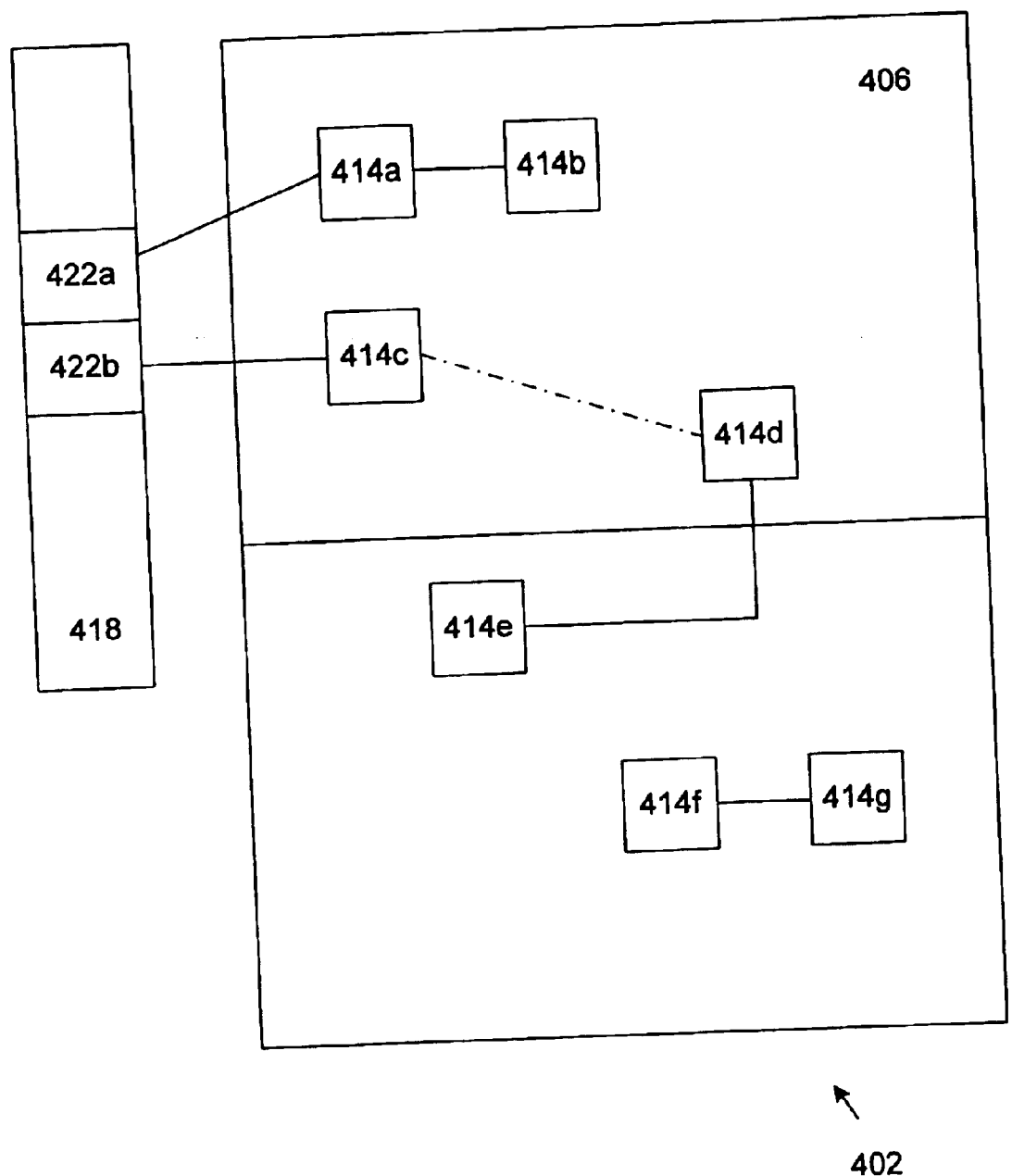
FIG. 4 is a diagrammatic representation of a memory space in accordance with an embodiment of the present invention.

In one embodiment, a generational garbage collector may be a garbage collector which is suitable for swapping into and swapping out of the system. A generational garbage collector may be used with respect to a memory space which is divided into a "young" space and an "old" space. FIG. 4 is a diagrammatic representation of a memory space in accordance with an embodiment of the present invention. Within a memory space 402 or a heap, a division may be made to separate the memory space into a "young" space 406 and an "old" space 410. A root set 418 includes roots 422, e.g., exact roots, which reference objects 414 in memory space 402.

Within memory space 402, young space 406 is used for new object allocation, while old space 410 is used for tenured, or long-standing, objects 414, e.g., objects 414e–g. That is, young space 406 is associated with a relatively young generation of objects 414 while old space 410 is associated with a relatively old generation of objects 414. A generational garbage collector which performs garbage collection within memory space 402 typically copies older objects 414 from young space 406 into old space 410, then removes those objects 414 that were copied from young space 406, i.e., reclaims memory from young space 406 that was associated with objects 414 which were copied. A generational garbage collector would also remove dead objects 414, e.g., objects 414f and 414g, from both young space 406 and old space 410, as appropriate.

In one embodiment, different garbage collectors may be used to perform garbage collection on young space 406 and old space 410. Specifically, in addition to being able swap different generational garbage collectors into and out of a system without modifying virtual machine code, young space 406 and old space 410 may each have a different pluggable garbage collector. A garbage collection framework may enable generational garbage collection code to be shared by individual garbage collectors for young space 406 and old space 410. The shared garbage collection code may be arranged to coordinate the timing between the individual garbage collectors, or the specific code associated with each individual garbage collector, that may be independently maintained. For example, the shared code may determine a point in time during which at least one of the individual or independent garbage collectors should perform a particular action.

A shared interface for substantially pluggable generational garbage collectors may effectively invoke garbage collectors for each space or generation, e.g., a young generation or an old generation, based on need. For example, if a young space or generation is full, then the shared interface may invoke a garbage collection on the young space. As will be understood by those skilled in the art, most objects die young. Hence, with respect to FIG. 4, young space 406 is typically small in relation to old space 410. Garbage collection is, therefore, performed on young space 406 more frequently than it is performed on old space 410. Accordingly, the amount of time spent on garbage collection may be reduced by implementing garbage collections independently on young space 406 and old space 410 on an as-needed basis.

Figure 5:
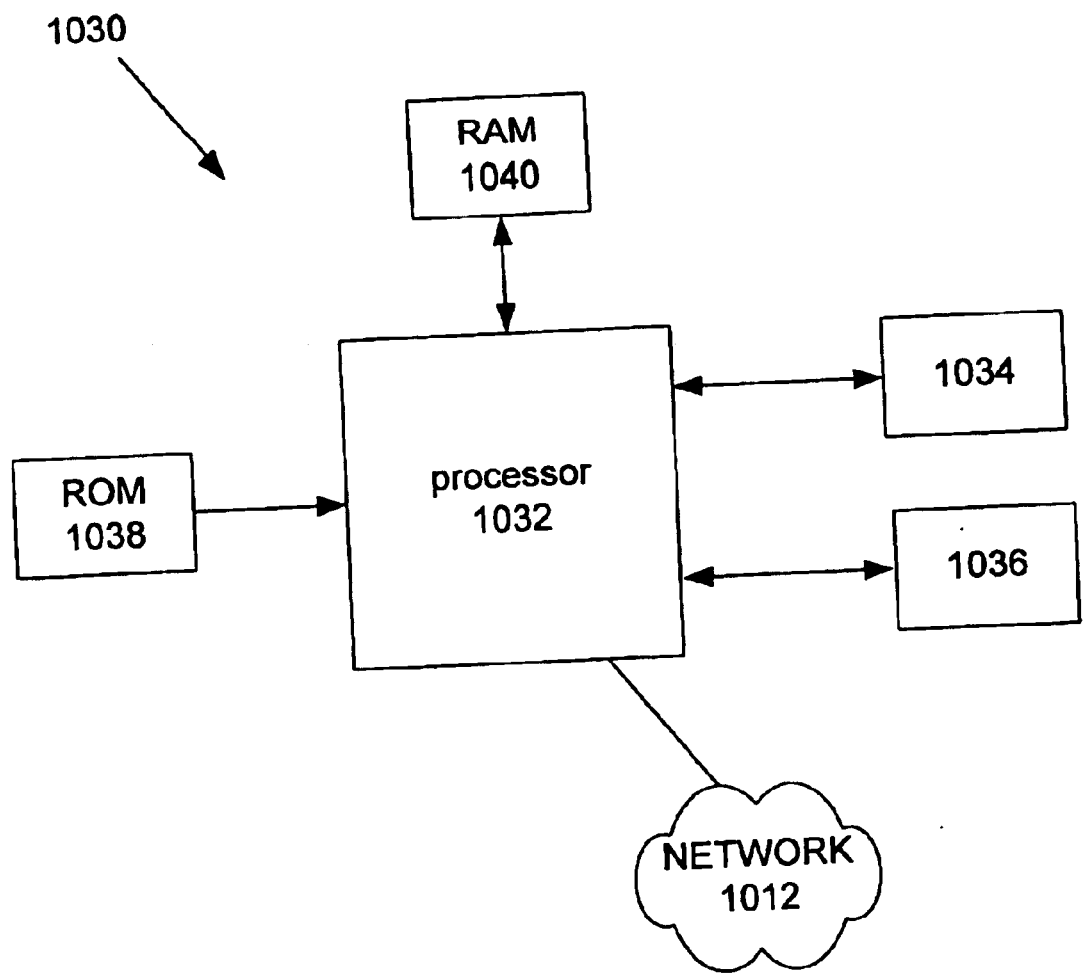
FIG. 5 is a diagrammatic representation of a general-purpose computer system suitable for implementing the present invention.

FIG. 5 illustrates a typical, general-purpose computer system suitable for implementing the present invention. The computer system 1030 includes at least one processor 1032 (also referred to as a central processing unit, or CPU) that is coupled to memory devices including primary storage devices 1036 (typically a read only memory, or ROM) and primary storage devices 1034 (typically a random access memory, or RAM).

Computer system 1030 or, more specifically, CPUs 1032, may be arranged to support a virtual machine, as will be appreciated by those skilled in the art. One example of a virtual machine that may be supported on computer system 1030 will be described below with reference to FIG. 6. As is well known in the art, ROM acts to transfer data and instructions uni-directionally to the CPUs 1032, while RAM is used typically to transfer data and instructions in a bi-directional manner. CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk or a tape which generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPUs 1032.

CPUs 1032 are also coupled to one or more input/output devices 1040 that may include, but are not limited to, devices such as video monitors, track balls, mice, keyboards, microphones, touch-sensitive displays, traducer card readers, magnetic or paper tape readers, tablets, styluses, voice or handwriting recognizers, or other well-known input devices such as, of course, other computers. Finally, CPUs 1032 optionally may be coupled to a computer or telecommunications network, e.g., an internet network or an intranet network, using a network connection as shown generally at 1012. With such a network connection, it is contemplated that the CPUs 1032 might receive information from the network, or might output information to the network in the course of performing the above-described method steps. Such information, which is often represented as a sequence of instructions to be executed using CPUs 1032, may be received from and outputted to the network, for example, in the form of a computer data signal embodied in a carrier wave. The above-described devices and materials will be familiar to those of skill in the computer hardware and software arts.

Figure 6:
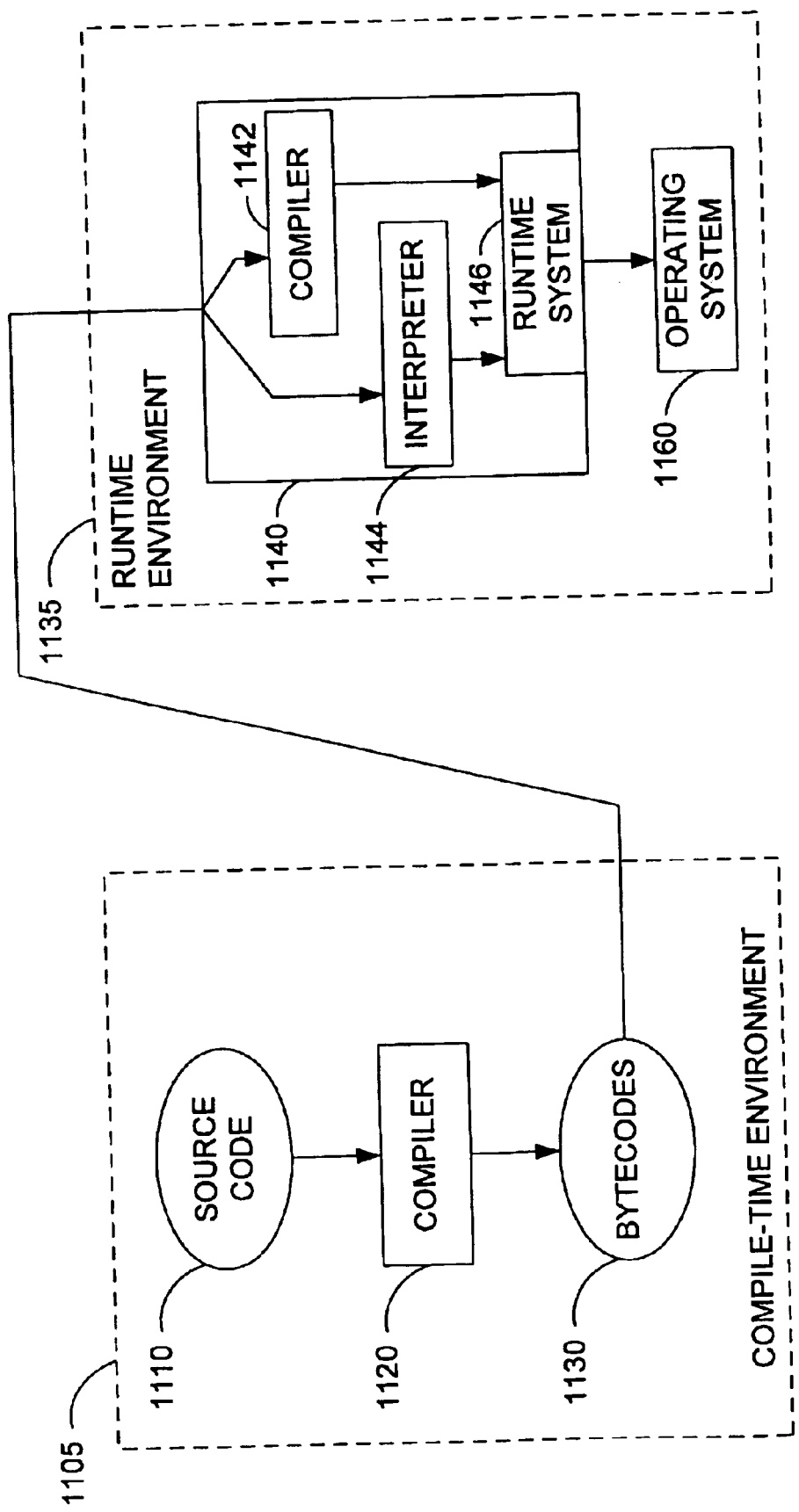
FIG. 6 is a diagrammatic representation of a virtual machine suitable for implementing the present invention.

As previously mentioned, a virtual machine may execute on computer system 1030. FIG. 6 is a diagrammatic representation of a virtual machine which is supported by computer system 1030 of FIG. 5, and is suitable for implementing the present invention. When a computer program, e.g. a computer program written in the Java™ programming language, is executed, source code 1110 is provided to a compiler 1120 within compile-time environment 1105. Compiler 1120 translates source code 1110 into bytecodes 1130. In general, source code 1110 is translated into bytecodes 1130 at the time source code 1110 is created by a software developer.

Bytecodes 1130 may generally be reproduced, downloaded, or otherwise distributed through a network, e.g., network 1012 of FIG. 5, or stored on a storage device such as primary storage 1034 of FIG. 5. In the described embodiment, bytecodes 1130 are platform independent. That is, bytecodes 1130 may be executed on substantially any computer system that is running on a suitable virtual machine 1140.

Bytecodes 1130 are provided to a runtime environment 1135 which includes virtual machine 1140. Runtime environment 1135 may generally be executed using a processor or processors such as CPUs 1032 of FIG. 5. Virtual machine 1140 includes a compiler 1142, an interpreter 1144, and a runtime system 1146. Bytecodes 1130 may be provided either to compiler 1142 or interpreter 1144.

When bytecodes 1130 are provided to compiler 1142, methods contained in bytecodes 1130 are compiled into machine instructions. In one embodiment, compiler 1142 is a just-in-time compiler which delays the compilation of methods contained in bytecodes 1130 until the methods are about to be executed. When bytecodes 1130 are provided to interpreter 1144, bytecodes 1130 are read into interpreter 1144 one bytecode at a time. Interpreter 1144 then performs the operation defined by each bytecode as each bytecode is read into interpreter 1144. That is, interpreter 1144 "interprets" bytecodes 1130, as will be appreciated by those skilled in the art. In general, interpreter 1144 processes bytecodes 1130 and performs operations associated with bytecodes 1130 substantially continuously.

When a method is invoked by another method, or is invoked from runtime environment 1135, if the method is interpreted, runtime system 1146 may obtain the method from runtime environment 1135 in the form of a sequence of bytecodes 1130, which may be directly executed by interpreter 1144. If, on the other hand, the method which is invoked is a compiled method which has not been compiled, runtime system 1146 also obtains the method from runtime environment 1135 in the form of a sequence of bytecodes 1130, then may go on to activate compiler 1142. Compiler 1142 then generates machine instructions from bytecodes 1130, and the resulting machine-language instructions may be executed directly by CPUs 1032. In general, the machine-language instructions are discarded when virtual machine 1140 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference.

Although only a few embodiments of the present invention have been described, it should be understood that the present invention may be embodied in many other specific forms without departing from the spirit or the scope of the present invention. By way of example, although the use of pluggable garbage collectors has been described as being suitable for use in a Java™ environment, pluggable garbage collectors may be implemented for use in substantially any suitable environment. Suitable environments include, but are not limited to, an environment which supports a Smalltalk virtual machine.

The interface between shared garbage collection code and algorithm-specific garbage collection code has been defined as including multiple routines or methods, some of which are part of shared garbage collection code and some of which are part of algorithm-specific garbage collection code. The names of routines and the number of routines associated with the interface, generally, may be widely varied. For instance, additional routines such as routines which are specific to supporting different garbage collectors for different generations of memory may be added to the interface.

In general, it should be appreciated that the steps associated with the various processes and methods of the present invention may be widely varied. For example, the steps associated with the methods may be altered or reordered. Steps may also be replaced, removed, and added without departing from the spirit or the scope of the present invention. Therefore, the present examples are to be considered as illustrative and not restrictive, and the invention is not to be limited to the details given herein, but may be modified within the scope of the appended claims.

What is claimed is:

1. A computer-implemented interface for reclaiming memory in a multi-threaded virtual machine environment, the multi-threaded virtual machine environment including a virtual machine, the computer-implemented interface comprising:

a first module, the first module being associated with the virtual machine and having routines configured to interact interchangeably with a plurality of garbage collectors, the routines including a first routine for initiating a garbage collection process within the virtual machine environment, a second routine for scanning roots associated with the virtual machine environment, a third routine for following roots through objects associated with the virtual machine environment; and a second module, the second module being separate from the first module, the second module being arranged to interface with the first module, the second module including a fourth routine for initializing a heap in the virtual machine environment, a fifth routine for allocating an object in the virtual machine environment, and a sixth routine for performing the garbage collection process.

2. A computer-implemented interface according to claim 1 wherein the second module further includes at least a seventh routine for implementing barriers for the garbage collection process.

3. A computer-implemented interface according to claim 2 wherein the barriers include a read barrier and a write barrier.

4. A computer-implemented interface according to claim 1 wherein the first module includes a seventh routine for handling particular objects associated with the virtual machine environment.

5. A computer-implemented interface according to claim 1 wherein the routines of the first module are further configured to interact interchangeably with a plurality of garbage collectors, the garbage collectors operating generally according to a plurality of garbage collection algorithms.

6. A computer-implemented interface according to claim 1 wherein the fourth, fifth, and sixth routines are each further configured to interact only with those garbage collectors that are algorithm-specific garbage collectors each operating generally according to the same garbage collection algorithm.

7. A computer-implemented interface for interchangeable use with garbage collectors in a virtual machine environment, comprising:

a first module, the first module being associated with the virtual machine and having common routines configured to interact interchangeably with a plurality of garbage collectors operating generally according to a plurality of garbage collection algorithms, the common routines including a first routine for initiating a garbage collection process within the virtual machine environment; and a second module, the second module being separate from the first module, the second module being arranged to interface with the first module and having algorithm-specific routines that are not configured to interact interchangeably with the plurality of garbage collectors, the algorithm-specific routines including a second routine for initializing a heap in the virtual machine environment.

8. The computer-implemented interface of claim 7 wherein the algorithm-specific routines are further configured to interact only with those garbage collectors that are algorithm-specific garbage collectors each operating generally according to the same garbage collection algorithm.

9. The computer-implemented interface of claim 7 wherein the first module further comprises a third routine for scanning roots associated with the virtual machine environment, a fourth routine for following roots through objects associated with the virtual machine environment.

10. A computer-implemented interface of claim 9 wherein the second module further comprises a fifth routine for allocating an object in the virtual machine environment, and a sixth routine for performing the garbage collection process.

11. The computer-implemented interface of claim 10 wherein the second module further includes at least a seventh routine for implementing barriers for the garbage collection process.

12. The computer-implemented interface of claim 11 wherein the barriers include a read barrier and a write barrier.

13. The computer-implemented interface of claim 7 wherein the first module includes a third routine for handling particular objects associated with the virtual machine environment.

* * * * *

UNITED STATES PATENT AND TRADEMARK OFFICE
CERTIFICATE OF CORRECTION

PATENT NO. : 6,836,782 B1
DATED : December 28, 2004
INVENTOR(S) : Fresko et al.

It is certified that error appears in the above-identified patent and that said Letters Patent is hereby corrected as shown below:

Column 7,
Line 19, change "traducer card" to -- transducer card --.

Column 10,
Line 26, change "A computer" to -- The computer --.

Signed and Sealed this

Twenty-fourth Day of May, 2005

JON W. DUDAS
*Director of the United States Patent and Trademark Office*